(12) United States Patent
Edwards

(10) Patent No.: US 8,813,591 B2
(45) Date of Patent: Aug. 26, 2014

(54) MAGNETIC GEAR ARRANGEMENT

(75) Inventor: Huw L. Edwards, Derby (GB)

(73) Assignee: Rolls-Royce PLC, London (GB)

(*) Notice: Subject to any disclaimer, the term of this patent is extended or adjusted under 35 U.S.C. 154(b) by 153 days.

(21) Appl. No.: 13/575,616

(22) PCT Filed: Jan. 13, 2011

(86) PCT No.: PCT/EP2011/050375
§ 371 (c)(1),
(2), (4) Date: Jul. 27, 2012

(87) PCT Pub. No.: WO2011/098317
PCT Pub. Date: Aug. 18, 2011

(65) Prior Publication Data
US 2012/0291575 A1    Nov. 22, 2012

(30) Foreign Application Priority Data

Feb. 15, 2010  (GB) .................................. 1001864.6

(51) Int. Cl.
*F16H 3/08*        (2006.01)
*H02K 49/00*    (2006.01)
*H02K 49/10*    (2006.01)

(52) U.S. Cl.
CPC .................................. *H02K 49/102* (2013.01)
USPC .......................................... 74/325; 310/103

(58) Field of Classification Search
USPC .................. 74/325; 310/103, 114, 156.01
See application file for complete search history.

(56) References Cited

U.S. PATENT DOCUMENTS 3,085,407 A * 4/1963 Tomlinson ..................... 464/29
6,710,492 B2 * 3/2004 Minagawa ..................... 310/113
8,598,759 B2 * 12/2013 Edwards et al. ............... 310/103
2006/0119201 A1  6/2006 Nissen

FOREIGN PATENT DOCUMENTS

| EP | 1 353 436 A2 | 10/2003 |
| GB | 887143 A | 1/1962 |
| GB | 2 457 226 A | 8/2009 |
| WO | WO 2007/107691 A1 | 9/2007 |
| WO | WO 2007/135360 A1 | 11/2007 |
| WO | WO 2009/130456 A2 | 10/2009 |
| WO | WO 2009/147377 A1 | 12/2009 |
| WO | WO 2010/015299 A1 | 2/2010 |
| WO | WO 2010/015300 A2 | 2/2010 |

OTHER PUBLICATIONS

Apr. 26, 2012 International Search Report issued in PCT/EP2011/050375.
Apr. 26, 2012 Written Opinion issued in PCT/EP2011/050375.
Jun. 3, 2010 Search Report issued in British Patent Application No. GB1001864.6.

* cited by examiner

*Primary Examiner* — Ha D Ho
(74) *Attorney, Agent, or Firm* — Oliff PLC

(57) ABSTRACT

A magnetic gear arrangement comprises: a first gear system having a plurality of first gear members, each first gear member generating a respective first magnetic field for that gear member; a second gear system having a second gear member generating a second magnetic field; and a coupling device which provides arrangements of interpoles between the first gear system and the second gear system. The first gear members are changeably selectable by the coupling device such that the interpoles couple the first magnetic field of a selected first gear member to the second magnetic field to produce a gear ratio between the first gear system and the second gear system, the gear ratio being changeable by changing the selected first gear member.

16 Claims, 7 Drawing Sheets

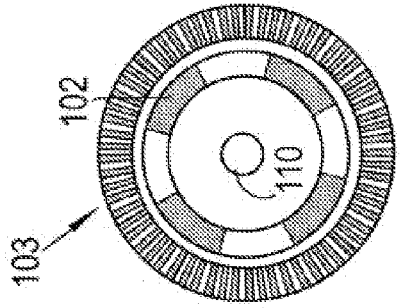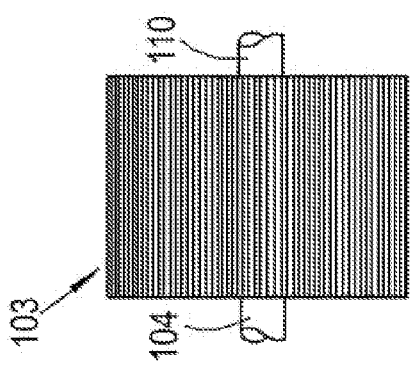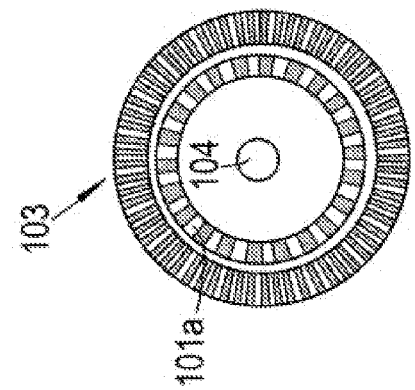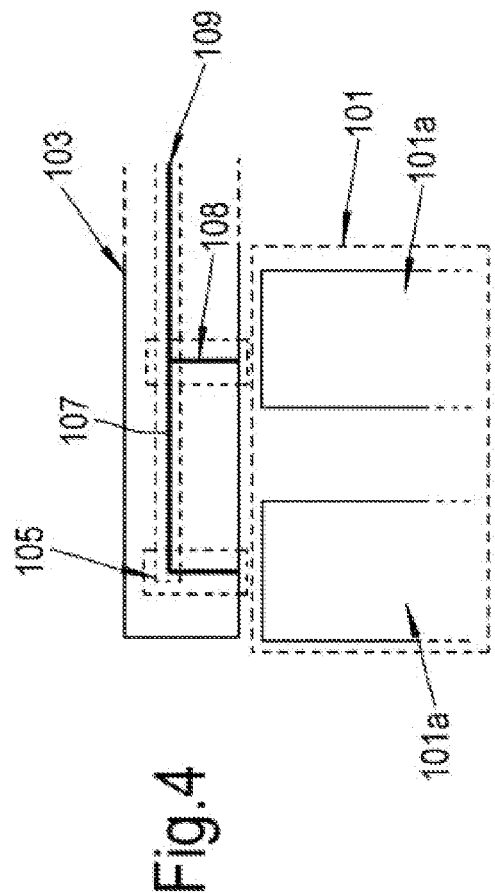

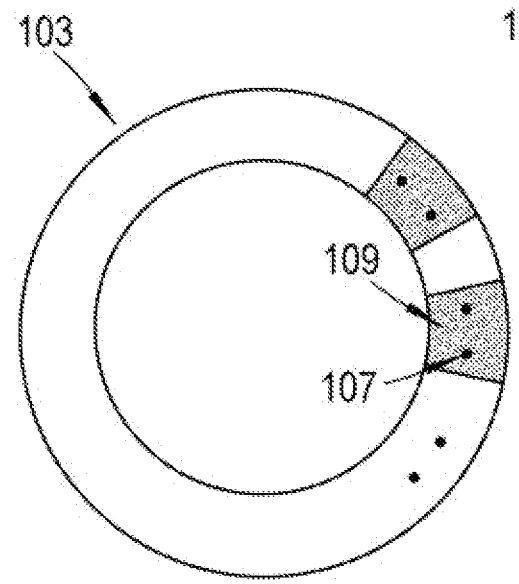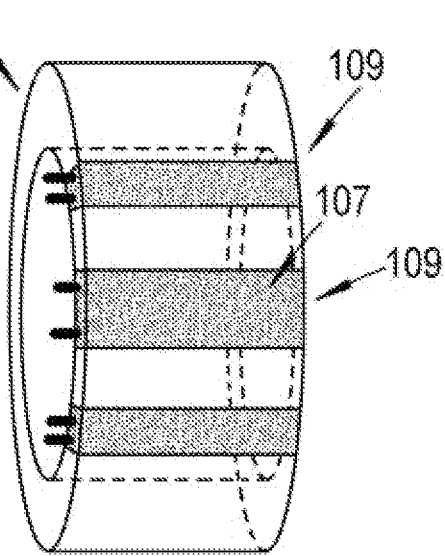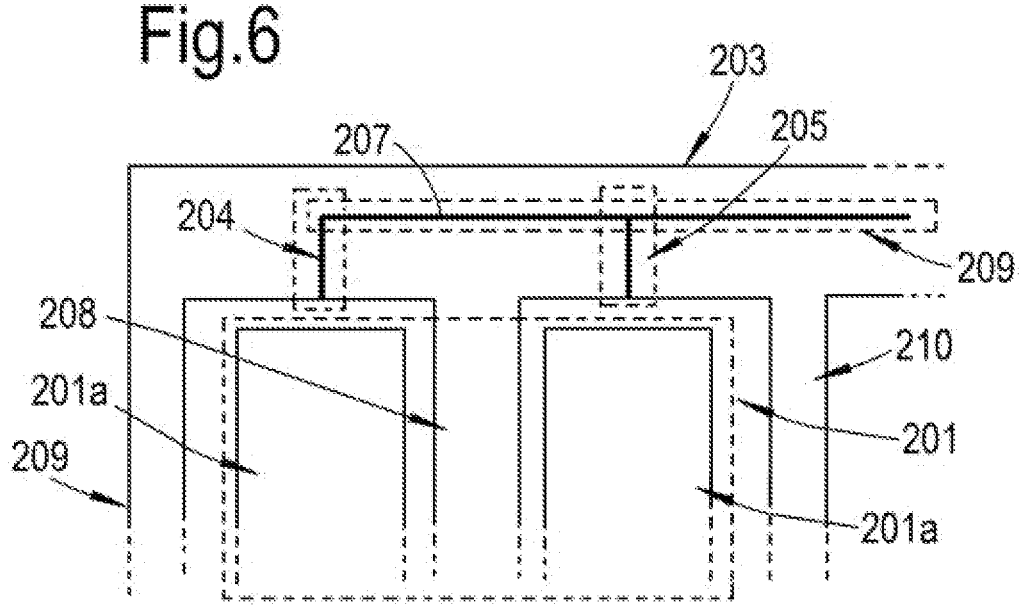

MAGNETIC GEAR ARRANGEMENT

BACKGROUND

The present invention relates to magnetic gear arrangements, particularly magnetic gear arrangements having a variable gear ratio.

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas, or for clandestine military activities.

More recently, magnetic gearboxes have been provided which comprise respective gear rotors with interpoles between them. The rotors incorporate permanent magnets, and the interpoles act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

FIG. 1 shows a schematic cross-sectional view of a magnetic gear arrangement of the prior art. The magnetic gear arrangement 1 is an epicyclic gearbox and comprises an inner rotor 2 and an outer rotor 6. Permanent magnets providing respective pole pairs 4, 8 are fixed to the inner and outer rotors 2, 6, the opposing poles of each permanent magnet being respectively indicated by dark and light shading. The permanent magnets 4 affixed to the inner rotor 2 have alternating polarity along the circumference of the rotor. Similarly, the permanent magnets 8 affixed to the outer rotor 6 have alternating polarity along the circumference of that rotor. Typically, one rotor is mechanically coupled to a drive mechanism and the other rotor is mechanically coupled to a driven mechanism.

The inner and outer rotors 2, 6 have different numbers of pole pairs 4, 8. Typically, the number of pole pairs of the outer rotor 6 is greater than the number of pole pairs of the inner rotor 2.

Pole elements 10 are provided between the inner rotor 202 and the outer rotor 6 and form an array to provide a coupling element having a cylindrical shape.

Each pole element 10 forms one interpole for modulating the magnetic fields produced by the inner rotor 2 and the outer rotor 6, so as to couple the two fields and hence the motion of the rotors. The angular position of the interpoles is a factor in determining the gearing of the magnetic gearbox.

For example, the motion of the rotors 2, 6 may be either co-rotational or counter-rotational, depending on the number of magnets affixed to each rotor and the angular position/number of interpoles. Further, the co-rotational and counter-rotational modes have respective optimum interpole angular spacings which maximise the effectiveness of coupling between the rotors for that mode and determine the gear ratio between the rotors. By varying the angular position of the interpoles it possible to provide different gear ratios between the rotors, for example by using harmonics of the magnetic fields produced by the inner rotor and/or the outer rotor, but at a cost of less effective coupling. Further, the number of such ratios is limited by the fixed number of poles on the rotors.

WO 2007/135369 discusses a variety of magnetic gear arrangements.

It would be desirable to provide gearboxes in which the gear ratio is readily adjustable, but without the loss of coupling effectiveness associated with for example interpole arrangements that make use of magnetic field harmonics.

SUMMARY

Accordingly, the present invention provides a magnetic gear arrangement comprising:

a first gear system having a plurality of first gear members, each first gear member generating a respective first magnetic field for that gear member, a second gear system having a second gear member generating a second magnetic field, and a coupling device which provides arrangements of interpoles between the first gear system and the second gear system;

wherein the first gear members are changeably selectable by the coupling device such that the interpoles couple the first magnetic field of a selected first gear member to the second magnetic field to produce a gear ratio between the first gear system and the second gear system, the gear ratio being changeable by changing the selected first gear member.

Advantageously, the coupling device can be configured so that for each gear ratio the angular position of the interpoles in the coupling device allows effective power transfer between gear members given their respective magnetic fields.

The magnetic gear arrangement may have any one or, to the extent that they are compatible, any combination of the following optional features.

The first and second gear systems typically have respective mechanical couplings. These couplings typically connect a drive mechanism and a driven mechanism.

The magnetic gear arrangement may be an inline gear arrangement, an epicyclic gear arrangement, or may have a different configuration. The gear members may be rotors or linear gear members.

Typically, the first and the second gear systems move relative to each other during operation of the gear arrangement, and the coupling device is stationary. However, some arrangements may be configured so that the coupling device moves relative to one of the gear systems during operation of the gear arrangement, and the other gear system is stationary. Alternatively both gear systems and the coupling device could be free to move.

Typically, the second gear system has a plurality of second gear members, each second gear member generating a respective second magnetic field for that gear member, and the first gear members and the second gear members are changeably selectable by the coupling device such that the interpoles couple the first magnetic field of the selected first gear member to the second magnetic field of a selected second gear member to produce a gear ratio between the first gear system and the second gear system, the gear ratio being changeable by changing the selected first gear member and/or by changing the selected second gear member.

By providing changeably selectable gear members on both the first and the second gear systems, suitable combinations of first and second gear members for a variety of different gear ratios can be achieved at the rated torque of the device.

Preferably, the coupling device is configured to provide different arrangements of interpoles. The different arrangements can thus adapt the coupling device to the gear ratios of different first gear member and second gear member combinations, e.g. allowing the coupling device to provide the interpole spacing which maximises the effectiveness of coupling for a given combination. However, the coupling device itself can then also vary the gearing between the first gear system and second gear system. For example, rearranging the interpoles of the coupling device can change the type (e.g. co-rotation or counter-rotation) and/or the extent (e.g. the torque transmissibilty) of the coupling between the first and second gear members. By a "different arrangement of interpoles" is meant a different number of interpoles in the coupling device and/or a different distribution of interpoles in the coupling device and/or a different effective cross-sectional area (for transmission of magnetic flux) of the interpoles in the coupling device, including the possibility that no interpoles may be provided, such that the first and second gear members are decoupled.

The coupling device may provide respective magnetic flux paths for the magnetic fields of the changeably selectable gear members, each flux path having an active state which encourages the magnetic fields to enter the interpoles via that flux path and an inactive state which discourages the magnetic fields to enter the interpoles via that flux path, whereby a gear member is selected by activating the magnetic flux path of that gear member and deactivating the magnetic flux paths of the other gear members of the respective gear system.

For example, the flux paths may be formed of magnetically permeable material and have respective control wiring such that, when current is passed through the wiring, the magnetically permeable material is magnetically saturated by a current-induced magnetic field to deactivate the respective flux paths.

In such an arrangement, preferably the coupling device also comprises a body of magnetically permeable material and further comprises further control wiring such that, when current is passed through the further control wiring, spaced regions of the body are magnetically saturated by a current-induced magnetic field, thereby forming discrete interpoles in the body between neighbouring magnetically saturated regions. In this way, the coupling device can be configured to provide different arrangements of interpoles.

Typically, the magnetically permeable material is a magnetically soft material, i.e. it exhibits low hysteresis losses. The coercivity of the magnetically permeable material is typically less than 60 Amperes per meter, preferably less than 30 Amperes per meter. The magnetically permeable material may be electrical steel. In general, this material is laminated in order to reduce loss through eddy currents.

In another example, the flux paths may be formed of superconducting material having a critical temperature and may have respective temperature control elements for controlling the temperatures of the flux paths such that, above the critical temperature, a flux path becomes active, and below the critical temperature a flux path becomes inactive. Above the critical temperature, the flux paths are permeable to magnetic fields and are thus able to participate in coupling the magnetic flux of first and second magnetic fields. Below the critical temperature, however, the Meissner effect causes the flux paths to repel surrounding magnetic fields. Thus simply by varying their temperatures, the flux paths can activated or deactivated.

In such an arrangement, the coupling device preferably further comprises a body of superconducting material having a critical temperature and further comprises a plurality of further temperature control elements for controlling the temperatures of respective regions of the body, such that above the critical temperature each region becomes active to at least partly form a respective interpole, and below the critical temperature each region becomes inactive. Again, in this way, the coupling device can be configured to provide different arrangements of interpoles. Advantageously, the coupling device can avoid using iron-based interpoles, and therefore avoid the consequent problems of magnetic saturation associated with ferromagnetic materials (which typically occurs at field strengths of less than 2T). The coupling device may thus be compatible with higher flux density superconducting fields, which can lead to an improved torque carrying capacity in the arrangement.

When the flux paths are formed of superconducting material, the first gear members preferably have superconducting magnets or coils for generating the first magnetic fields and the, or each, second gear member has superconducting magnets or coils for generating the second magnetic field.

The temperature control elements may be electrical resistance heating elements. However, non electrical heating elements may also be possible. For example, the temperature control elements may be thermally conductive members extending through the superconducting material, the thermally conductive members extending to a source of heat. Alternatively, the superconducting material could be cooled by coolant passages extending through the arrangement, and the temperature control elements may be passive is elements, such as valves, which can be controlled to prevent the flow of coolant to selected passages, thereby forming heated regions above the critical temperature in the superconducting material surrounding those passages. The coupling device may have thermally insulating elements which reduce the flow of heat from regions above the critical temperature to regions below the critical temperature.

When the flux paths are formed of superconducting material, the magnetic gear arrangement may further comprise a separator element between the first gear system and the second gear system, the separator element being formed of a superconducting material, wherein the separator element prevents or discourages magnetic flux extending between the first and second gear members but bypassing the coupling device. The magnetic gear arrangement may further comprise further separator elements between neighbouring gear members, the further separator elements being formed of superconducting material, wherein the further separator elements prevent or discourage magnetic flux extending between neighbouring gear members. The magnetic gear arrangement may further comprise a housing for the first and second gear systems and the coupling device, the housing being formed of a superconducting material (alternatively the housing could be made from other materials, typically steel or copper, or a combination of the two). A superconducting housing in particular may be advantageous if the gear members have superconducting magnets or coils, as it can then contain the very strong magnetic field which may be produced by the magnets or coils. Preferably, the critical temperature of the, or each, separator element and/or of the housing is equal to or greater than the critical temperature of the superconducting material of the coupling device, so that when the coupling device, and the separator element(s) and/or housing are cooled to the same temperature below the critical temperature of the coupling device, they can all be in a superconducting state.

When the flux paths are formed of superconducting material, the magnetic gear arrangement typically further comprises a cooling system for the superconducting material of the coupling device. If the magnets or coils on the gear members are non-superconducting, the cooling system may only need to cool the coupling device itself. However, if the gear members have superconducting magnets or coils, then the cooling system preferably cools the gear members as well. The cooling system may then require seals for mechanical couplings to the gear systems to enter the cooled region.

In another example, the flux paths may be formed of ferromagnetic material having a Curie temperature and may have respective temperature control elements (such as electrical resistance heating elements) for controlling the temperatures of the flux paths such that, below the Curie temperature, a flux path becomes active, and above the Curie temperature a flux path becomes inactive. Above the Curie temperature, a ferromagnetic material becomes paramagnetic, rendering a flux path formed of such a material inactive.

In such an arrangement, the coupling device preferably comprises a plurality of ferromagnetic pole elements which at least partly form the interpoles, each pole element having a Curie temperature, and the coupling device further comprises further temperature control elements (such as electrical resistance heating elements) for controlling the temperatures of the pole elements such that, below the Curie temperature, a pole element becomes active, and above the Curie temperature a pole element becomes inactive. In this way, the coupling device can be configured to provide different arrangements of interpoles. The pole elements may be formed into a continuous body (for example by forming the coupling device from a material with a sufficiently low thermal conductivity), but preferably are at least thermally isolated from each other to facilitate separate thermal control of each pole element.

As an alternative to providing a plurality of activatable/deactivatable flux paths, the coupling device may provide a magnetically permeable element which is movable between changeably selectable gear members, a particular gear member being selected by moving the magnetically permeable element to that gear member such that the magnetically permeable element forms a magnetic flux path which encourages the respective magnetic field to enter the interpoles via the magnetically permeable element. In particular, when the second gear system has a plurality of gear members, the coupling device may provide a first magnetically permeable element for the first gear members and a second magnetically permeable element for the second gear members.

In such an arrangement, the coupling device preferably comprises a plurality of pole elements which at least partly form the interpoles, each pole element being movable into and out of a respective active location, and the coupling device further comprises an actuator system (e.g. electrically of hydraulically operated) for moving the pole elements into and out of the active locations such that, in an active location, a pole element forms or contributes to an interpole, and outside of an active location, a pole element does not form or contribute to an interpole. In this way, the coupling device can be configured to provide different arrangements of interpoles.

The first gear members may have ferromagnets, superconducting magnets, or coils (superconducting or otherwise) for generating the respective first magnetic fields. Likewise, the, or each, second gear member may have ferromagnets, superconducting magnets, or coils (superconducting or otherwise) for generating the second magnetic field. Preferably, superconducting magnets or superconducting coils are used when the coupling device provides magnetic flux paths formed of superconducting material. Superconducting magnets and coils can produce higher flux densities than ferromagnets or non-superconducting coils. In addition, gear members with superconducting magnets may be easier to manufacture than gear members with ferromagnets, since the superconducting magnets can be magnetised in situ, e.g. using flux pumping.

BRIEF DESCRIPTION OF THE DRAWINGS

Embodiments of the invention will now be described by way of example with reference to the accompanying drawings in which:

FIG. 3 shows schematically the gearbox of FIG. 2 in (a) an end-on view of a first gear system and a coupling device, (b) an end-on view of a second gear system and the coupling device, and (c) a side view;

FIG. 4 is a close-up schematic view of an end of the coupling device of the gearbox of FIG. 2;

FIG. 5 shows schematically the coupling device of the gearbox of FIG. 2 in (a) a transverse cross-section and (b) a side view with internal features;

FIG. 6 is a close-up schematic view of an end of a coupling device of a second embodiment of an in-line gearbox;

DETAILED DESCRIPTION OF THE EMBODIMENTS

Figure 2:
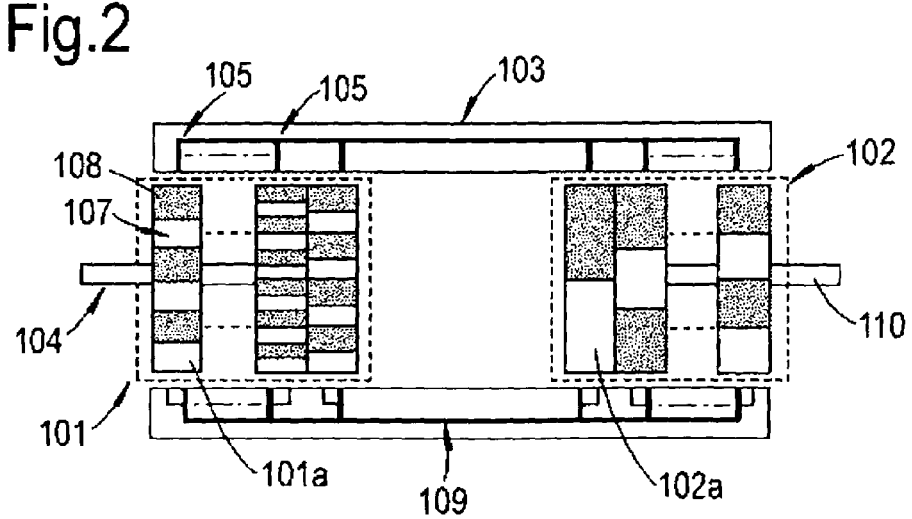
FIG. 2 shows schematically a first embodiment of an in-line gearbox in internal side view.

A first embodiment of a magnetic gear arrangement takes the form of an in-line gearbox having a first gear system 101, a second gear system 102, and a cylindrical coupling device 103. FIG. 2 shows schematically the gearbox in internal side view.

Each gear system 101, 102 has a plurality of respective rotors 101a, 102a. The rotors carry permanent magnets forming respective poles 107, 108, the opposing poles of each magnet being respectively indicated by dark and light shading. The poles are uniformly circumferentially distributed and have alternating polarities around the circumferences of the rotors. FIG. 3 shows schematically the gearbox in (a) an end-on view of the first gear system 101 and the coupling device 103, (b) an end-on view of the second gear system 102 and the coupling device 103, and (c) a side view.

The rotors 101a of the first gear system 101 have different numbers of poles 107, 108. Likewise, the rotors 102a of the second gear system 102 have different numbers of poles 107, 108. Each rotor 101a of the first gear system is can be used with any rotor 102a of the second gear system, the ratio of the number of pole pairs of each of the two rotors in use determines the respective gear ratio for the pair of rotors. The rotors 101a of the first gear system 101 typically carry more pole pairs than the rotors 102a of the second gear system 102, making the drive shaft 104 extending from the first gear system 101 the low speed shaft, and the drive shaft 110 extending from the second gear system 102 the high speed shaft. However, the gearbox could be designed to allow both a step up and step down in speed, depending on which rotors are selected from gear systems 101 and 102.

The coupling device 103 extends between and surrounds the gear systems 101, 102, and comprises a cylindrical body made of electrical steel, which may be laminated for example in a radial direction of the unitary body. The coupling device 103 forms interpoles 109 which modulate and couple the magnetic fields provided by paired rotors 101a, 102a. However, the coupling device 103 also selects which pairs of rotors 101a, 102a are to be coupled via activatable and deactivatable flux paths 105.

Figure 1:
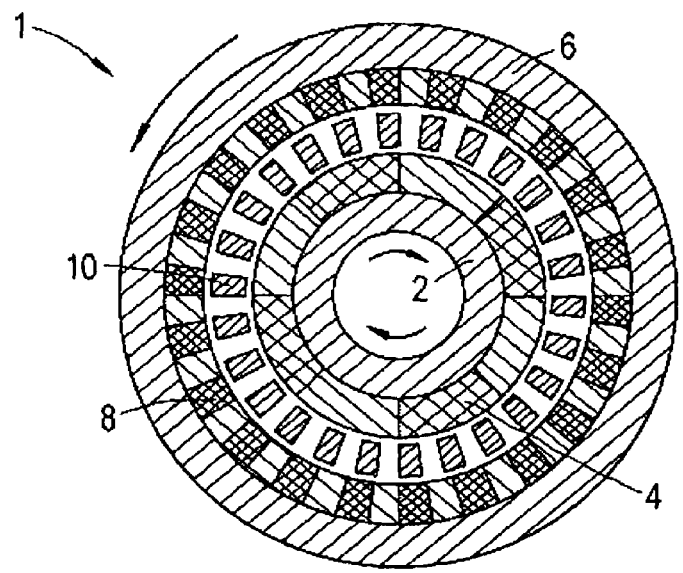
FIG. 1 shows a schematic cross-sectional view of a magnetic gear arrangement of the prior art.

As shown in FIG. 4, which is a close-up schematic view of an end of the coupling device 103, electrical conductors (e.g. wires) 107 extend longitudinally through the coupling device 103. The conductors are electrically insulated from the electrical steel of the coupling device 103. Electrical current passing through the conductors produces a magnetic field around the conductors. When the current is sufficiently large, the magnetisation of the region around the conductors is strong enough for that region to become saturated and effectively impermeable to magnetic flux. This region therefore forms a barrier to the magnetic flux passing between paired rotors 101a, 102a. However, the regions of the coupling device 103 that are remote from the conductors remain permeable to magnetic flux. These regions are circumferentially spaced around the coupling device 103 and their boundaries are provided by the magnetically saturated regions. Each permeable region can therefore form an interpole 109, corresponding to an interpole 10 of the prior art gearbox shown in FIG. 1. Depending on which rotors 101a, 102a are to be paired, an appropriate angular spacing of interpoles can be formed by suitable selection of the conductors 107 though which current is passed. Thus the total number of conductors 107 and their positioning in the coupling device 103 depends on the number of poles 107, 108 on the rotors 101a, 102a and the desired number of permutations of the angular positioning of the interpoles.

FIG. 5 shows schematically the coupling device 103 in (a) a transverse cross-section and (b) a side view with internal features. The conductors 107 have their go and return paths side-by side along the length of device. The saturated regions surrounding the conductors which form the interpoles 109 are shaded grey.

Electrical conductors 108 (e.g. electrically insulated wires) are also located in the coupling device 103 between each rotor 101a, 102a and the conductors 107 to form the activatable and deactivatable flux paths 105. Each conductor 108 may take the form of one or wires following a circular path around the circumference of a respective rotor. When a current is passed though a conductor 108 a saturation field is produced reducing the permeability of the surrounding region of the coupling device 103, i.e. that surrounding region is a deactivated flux path 105. To allow flux to extend from a rotor 101a, 102a to the interpoles 109, the current is stopped, increasing the permeability of the surrounding region of the coupling device 103 so that the surrounding region becomes an activated flux path 105.

In a second embodiment, an in-line gearbox has a first gear system, a second gear system, and a cylindrical coupling device, in a similar arrangement to that of the first embodiment. However, in the second embodiment, the coupling device is formed from a cylinder of superconducting material (such as magnesium diboride). Above its critical temperature, the material preferably provides a high magnetic permeability to encourage magnetic flux to extend through the material in preference to e.g. surrounding air, and also preferably has a high flux density saturation level. Below its critical temperature, the material repels magnetic fields due to the Meissner effect and thus is inactive in coupling the magnetic flux. In the gearbox, the coupling device is cooled, e.g. by a coolant, to a temperature below the critical temperature.

Figure 7:
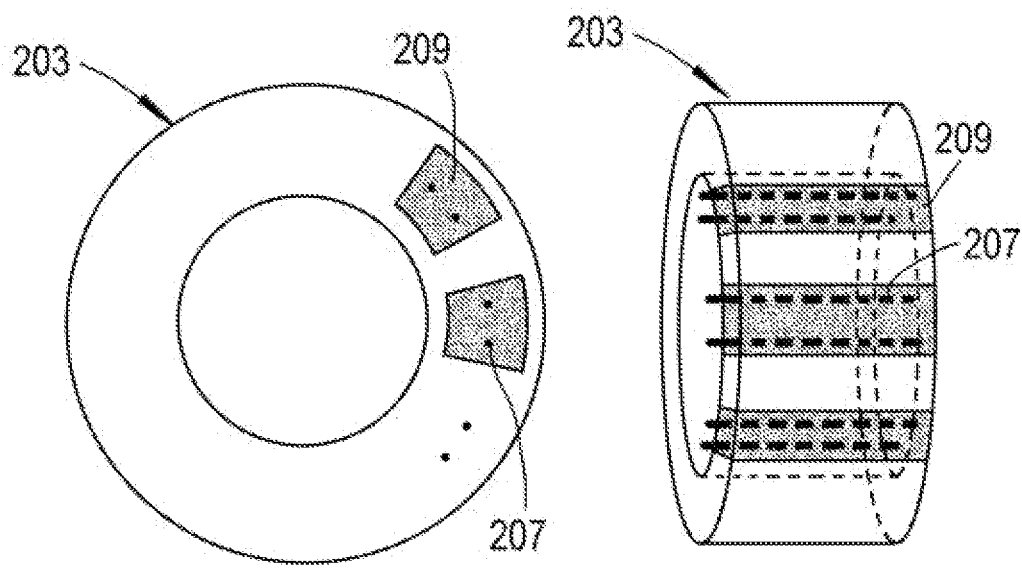
FIG. 7 is a schematic transverse cross-section through the coupling device of the gearbox of FIG. 6.

FIG. 6 is a close-up schematic view of an end of the coupling device 203, electrical heating elements (e.g. wires) 207 extend longitudinally through the coupling device. FIG. 7 shows schematically the coupling device 203 in (a) a transverse cross-section and (b) a side view with internal features. Electrical current passing through the heating elements 207 raises the temperature of the surrounding region (shaded grey in FIG. 7(b)) of superconducting material to above the critical temperature and thus renders the region permeable to the magnetic fields generated by the first 201a and second rotors of the first 201 and second gear systems. The extent of the heated regions depends on factors such as the thermal conductivity of the superconducting material, the heat flow from the conductors, and the effectiveness of the coolant. Thermally insulating elements (not shown) may be included in the coupling device to reduce the flow of heat from the heated regions to the non-heated regions of the device. For example, the superconducting material of the device may have recesses, slots or gaps which receive sheets of thermally insulating material and which define the boundaries of the heated regions. The heated regions form interpoles 209. Again, an appropriate angular spacing of interpoles can be formed by suitable selection of the heating elements 207 though which current is passed. Preferably, the heated regions do not extend to the inner and outer surfaces of the coupling device, as this helps the magnetic field to stay within the interpoles 209.

The current flowing through the heating elements 207 produces a magnetic field which could interact with the fields generated by the rotors to produce an unwanted reaction force in the coupling device. To eliminate or reduce this effect, the heating elements can be arranged, e.g. as twisted wire pairs with the current in each wire of the pair flowing in a different direction. With such an arrangement the magnetic field produced by one wire is cancelled out by the magnetic field produced by the other wire of the pair. The heating elements are typically electrically insulated from the surrounding superconducting material, but not thermally insulated.

Further heating elements 204 (e.g. electrically insulated twisted pair wires) are also located in the coupling device 204 between each rotor and the heating elements 207 to form the activatable and deactivatable flux paths 205. Each heating element 204 may take the form of one or more twisted pair wires following a circular path around the circumference of a respective rotor 201a. When a current is passed though a heating element 204, a surrounding heated region is produced in which the temperature is higher than the critical temperature rendering the region permeable to the magnetic fields. The surrounding region is thus an activated flux path which allows flux to extend from the respective rotor to the interpoles 209. When the current is stopped, the temperature drops to below the critical temperature, and the flux path becomes inactive.

Figure 8:
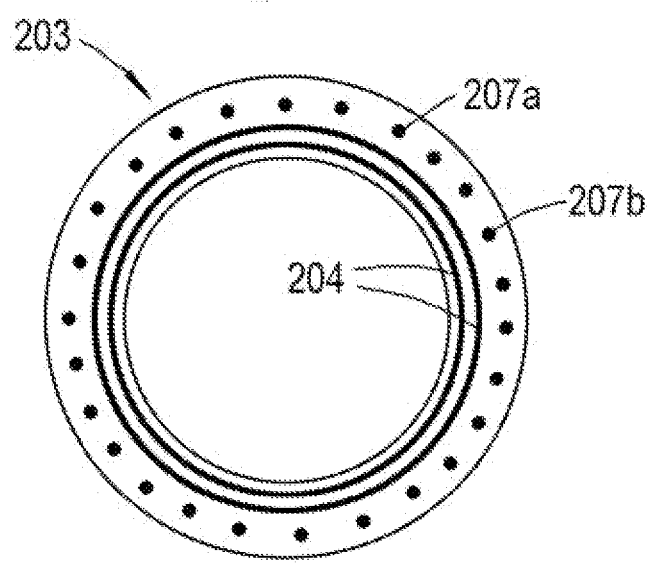
FIG. 8 is a schematic transverse cross-section through a variant of the coupling device of FIG. 7.

FIG. 8 is a schematic transverse cross-section through a variant of the coupling device 203 at a position through one of the flux paths 205. In the variant, heating elements 207a (black) and heating elements 207b (grey) can be activated singly or together to provide different arrangements of interpoles. The cross-section also illustrates the circular path of heating elements 204 around the respective rotor.

Sheets 208, 210 of superconducting material may be positioned between neighbouring rotors 201a and between the first and second gear systems to prevent magnetic flux from travelling directly from one rotor to another either within a gear system or between gear systems. In addition, the ends of the coupling device 203 can have lids 209 of superconducting material to form a closed superconducting housing around the gearbox. This can help to contain stray fields.

The critical temperature of the sheets and the lids can be equal to or greater than the critical temperature of the coupling device 203, so that they are in a superconducting state when they are cooled by the coolant to the same temperature below the critical temperature of the coupling device.

The heating elements 204, 207 can be under the control of a temperature controller (not shown) which is able to switch the elements on and off, and set the level of current to the elements, in order to achieve different gear ratios (through selection of pairs of rotors from the first and second gear systems) and different coupling effects.

The rotors can carry superconducting magnets or coils to form their respective magnetic fields. Advantageously, the superconducting material of the coupling device 203 is compatible with a superconducting magnetic field. For example, the superconducting field could be between 10 and 17T, providing a gearbox with a high gravimetric and volumetric power/torque density.

In a third embodiment, an in-line gearbox has a first gear system, a second gear system, and a cylindrical coupling device, in a similar arrangement to that of the first and second embodiments. However, in the third embodiment, the coupling device comprises a plurality of longitudinally extending and circumferentially distributed ferromagnetic pole elements having a Curie temperature.

The coupling device has first heating elements (e.g. electrically insulated twisted pair wires), like the heating elements 207 of the second embodiment, for heating respective pole elements. Current flowing through the heating elements causes the temperature of the respective pole elements to increase above the Curie temperature, rendering those pole elements impermeable to the magnetic fields. On the other hand, pole elements which are not heated remain permeable and form the interpoles. Different arrangements of interpoles can thus be formed by heating different pole elements.

Further heating elements, like the heating elements 204 of the second embodiment, are located in the coupling device between each rotor and the first heating elements to form the activatable and deactivatable flux paths. Each further heating element can take the form of twisted pair wires following a circular path around the circumference of a respective rotor. When a current is passed though the elements, heated regions around the elements become impermeable to magnetic flux, deactivating the respective flux path. In use, typically only one of the flux paths associated with each gear system is active so that just one rotor from one gear system is coupled with just one rotor from the other gear system.

Figure 9:
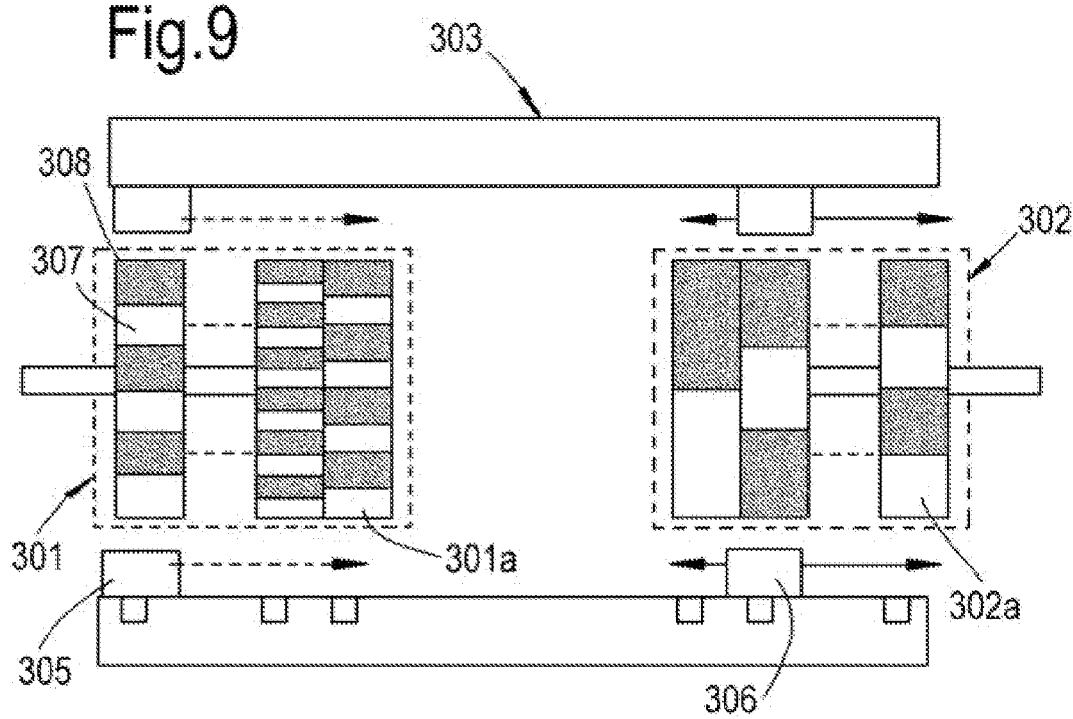
FIG. 9 shows schematically a fourth embodiment of an in-line gearbox in internal side view.

A fourth embodiment of an in-line gearbox has a first gear system 301, a second gear system 302, and a cylindrical coupling device 303. FIG. 9 shows schematically the gearbox in internal side view. As with the previous embodiments, each gear system 301, 302 has a plurality of respective rotors 301a, 302a. The rotors carry permanent magnets forming respective poles 307, 308.

However, in the fourth embodiment, the coupling device 303 is configured to provide mechanical selection of the paired rotors. More specifically, the coupling device has a first magnetically permeable ring 305 which surrounds and is movable between rotors 301a of the first gear system, and a second magnetically permeable ring 306 which surrounds and is movable between rotors 302a of the second gear system. The movement can be actuated, for example, electrically (e.g. by solenoids) or hydraulically. When the respective ring is located over a rotor of one gear system, that rotor is selected for coupling to the correspondingly selected rotor of the other gear system, the rings encouraging the magnetic fields of the selected rotors to extend through the interpoles formed by the coupling device. Different arrangements of interpoles in the coupling device for compatibility with the selected rotors can be obtained, for example, by movement of magnetically permeable pole elements into and out of the coupling device, individual pole elements, or combinations of pole elements, forming interpoles when in the device.

Figure 10A:
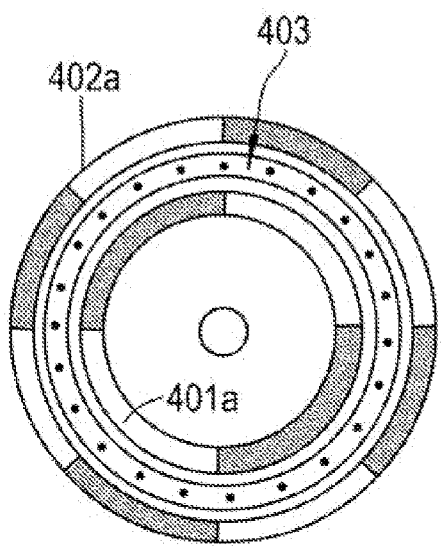
FIG. 10 shows schematically (a) an end view, and (b) an internal side view of an epicyclic gearbox.
Figure 10B:
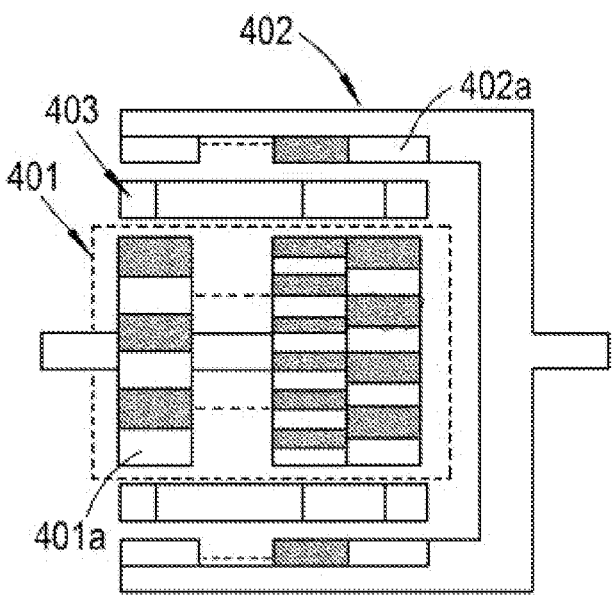

Many different magnetic gear arrangements are possible. FIG. 10 shows schematically (a) an end view, and (b) an internal side view of an epicyclic gearbox having a first gear system 401, a second gear system 402, and a cylindrical coupling device 403. Each gear system 401, 402 has a plurality of respective rotors 401a, 402a, with the rotors carrying permanent magnets forming respective poles 407, 408. Typically each gear system has the same number of rotors. For example, respective rotor pairs for forming the different gear ratios can radially face other. Drive shafts 404, 410 extend from the gear systems.

Figure 11:
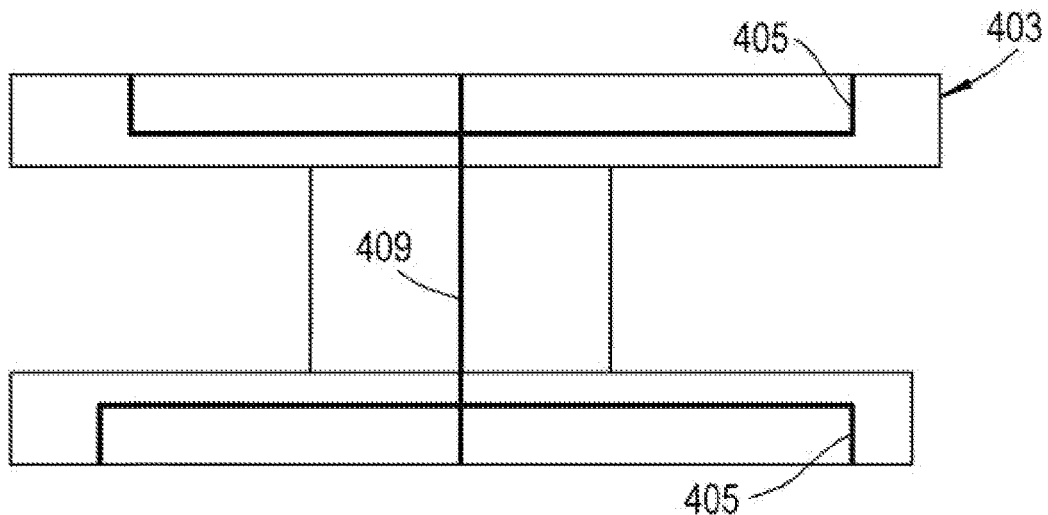
FIG. 11 shows schematically a cross-section through one cylinder wall of a coupling device of the gearbox of FIG. 10.

A schematic cross-section through one cylinder wall of the coupling device 403 is shown in FIG. 11. The device is positioned between the two gear systems and provides interpoles 409 for coupling the magnetic field of a selected rotor 401a to the magnetic field of a selected rotor 402a. The coupling device also provides flux paths 405 having active states which encourage the magnetic fields to enter the interpoles via that flux path and inactive states which discourage the magnetic fields to enter the interpoles via that flux path. The interpole arrangements and the active or inactive status of the flux paths can be controlled electrically, thermally or mechanically, as explained above in relation to the in-line embodiments. To save weight, the coupling device can have a reduced axial length at mid wall, the full axial length only being required at the radially inner and outer sides of the wall to provide access to all the rotors of each gear system.

Figure 12:
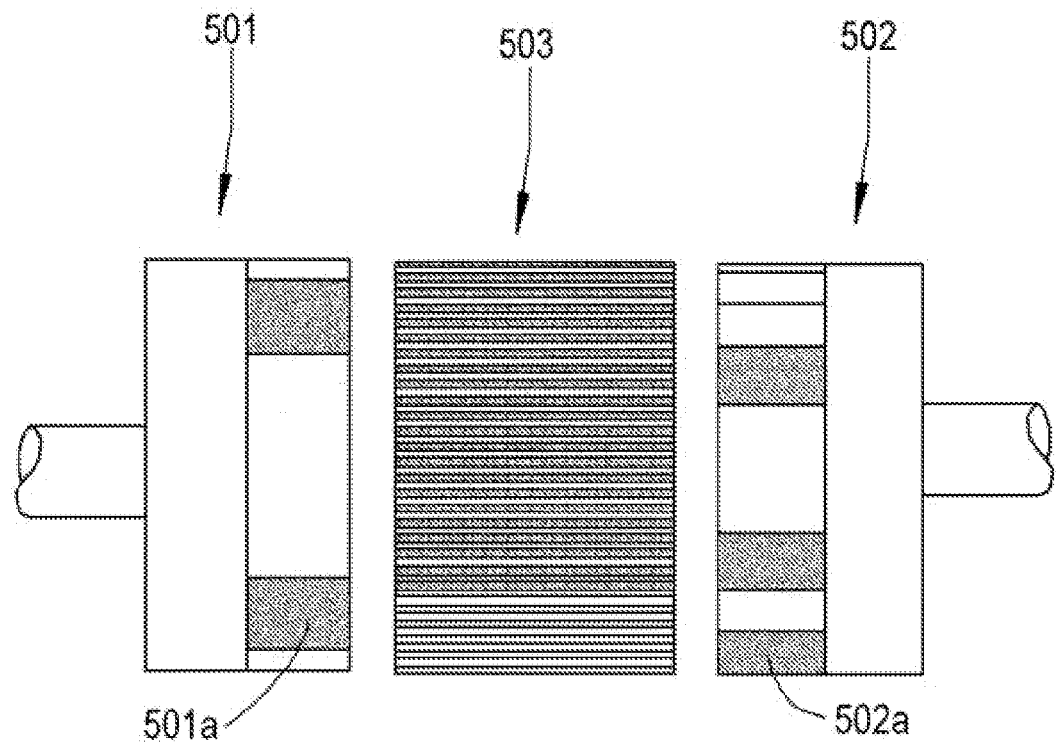
FIG. 12 shows schematically a side view of a variant in-line gearbox.
Figure 13:
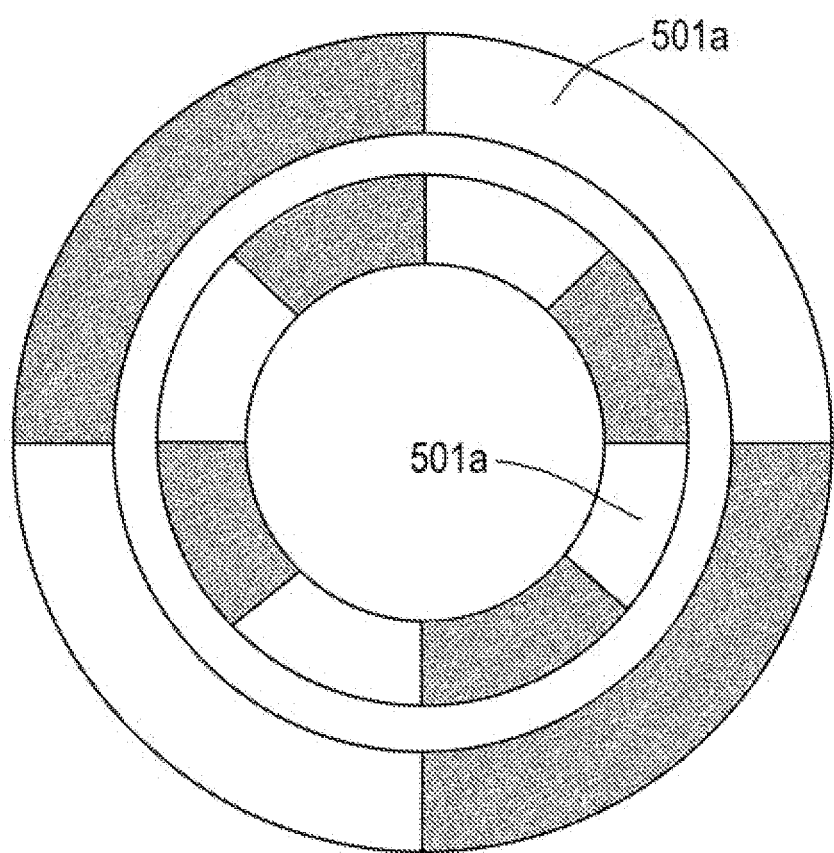
FIG. 13 shows schematically an end view of a first gear system of the gearbox of FIG. 12.

FIG. 12 shows schematically a side view of a variant in-line gearbox having a first gear system 501, a second gear system 502, and a cylindrical coupling device 503. In this variant, the rotors 502a of each gear system are arranged concentrically, as shown schematically in the end view of the first gear system shown in FIG. 13, and the flux paths for selecting the rotors are formed at the ends of the cylindrical coupling device. The ends, therefore, have to have a wall thickness sufficient to cover all the rotors, but the thickness can be reduced towards in the central region of the cylinder.

As well as rotary gear arrangements, the present invention can also be applied to e.g. linear gear arrangements.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:
1. A magnetic gear arrangement comprising:
   a first gear system having a plurality of first gear members, each first gear member generating a respective first magnetic field for that said first gear member,
   a second gear system having a second gear member generating a second magnetic field, and a coupling device which provides arrangements of interpoles between the first gear system and the second gear system;
wherein the first gear members are changeably selectable by the coupling device such that the interpoles couple the first magnetic field of a selected first gear member to the second magnetic field to produce a gear ratio between the first gear system and the second gear system, the gear ratio being changeable by changing the selected first gear member.

2. A magnetic gear arrangement according to claim 1, wherein:
the second gear system has a plurality of second gear members, each second gear member generating a respective second magnetic field for that said second gear member, and
the first gear members and the second gear members are changeably selectable by the coupling device such that the interpoles couple the first magnetic field of the selected first gear member to the second magnetic field of a selected second gear member to produce a gear ratio between the first gear system and the second gear system, the gear ratio being changeable by changing the selected first gear member and/or by changing the selected second gear member.

3. A magnetic gear arrangement according to claim 1, wherein the coupling device is configured to provide different arrangements of interpoles.

4. A magnetic gear arrangement according to claim 1, wherein the coupling device provides respective magnetic flux paths for the magnetic fields of the changeably selectable first gear members, each flux path having an active state which encourages the magnetic fields to enter the interpoles via that flux path and an inactive state which discourages the magnetic fields to enter the interpoles via that flux path, whereby a first gear member is selected by activating the magnetic flux path of that said first gear member and deactivating the magnetic flux paths of other said first gear members of the respective first gear system.

5. A magnetic gear arrangement according to claim 4, wherein the flux paths are formed of magnetically permeable material and have respective control wiring such that, when current is passed through the control wiring, the magnetically permeable material is magnetically saturated by a current-induced magnetic field to deactivate the respective flux paths.

6. A magnetic gear arrangement according to claim 5, wherein the coupling device comprises a body of magnetically permeable material and further comprises further control wiring such that, when current is passed through the further control wiring, spaced regions of the body are magnetically saturated by a current-induced magnetic field, thereby forming discrete interpoles in the body between neighbouring magnetically saturated regions.

7. A magnetic gear arrangement according to claim 4, wherein the flux paths are formed of superconducting material having a critical temperature and have respective temperature control elements for controlling the temperatures of the flux paths such that, above the critical temperature, a flux path becomes active, and below the critical temperature a flux path becomes inactive.

8. A magnetic gear arrangement according to claim 7, wherein the coupling device comprises a body of superconducting material having a critical temperature and further comprises a plurality of further temperature control elements for controlling the temperatures of respective regions of the body, such that above the critical temperature each region becomes active to at least partly form a respective interpole, and below the critical temperature each region becomes inactive.

9. A magnetic gear arrangement according to claim 7, wherein the first gear members have superconducting magnets or coils for generating the first magnetic fields and the second gear member has superconducting magnets or coils for generating the second magnetic field.

10. A magnetic gear arrangement according to claim 7 further comprising a separator element between the first gear system and the second gear system, the separator element being formed of superconducting material, wherein the separator element prevents or discourages magnetic flux extending between the first and second gear systems but bypassing the coupling device.

11. A magnetic gear arrangement according to claim 7 further comprising further separator elements between neighbouring gear members, the further separator elements being formed of superconducting material, wherein the further separator elements prevent or discourage magnetic flux extending between neighbouring gear members.

12. A magnetic gear arrangement according to claim 7 further comprising a housing for the first and second gear systems and the coupling device, the housing being formed of superconducting material.

13. A magnetic gear arrangement according to claim 4, wherein the flux paths are formed of ferromagnetic material having a Curie temperature and have respective temperature control elements for controlling the temperatures of the flux paths such that, below the Curie temperature, a flux path becomes active, and above the Curie temperature a flux path becomes inactive.

14. A magnetic gear arrangement according to claim 13, wherein the coupling device comprises a plurality of ferromagnetic pole elements which at least partly form the interpoles, each pole element having a Curie temperature, and the coupling device further comprising further temperature control elements for controlling the temperatures of the pole elements such that, below the Curie temperature, a pole element becomes active, and above the Curie temperature a pole element becomes inactive.

15. A magnetic gear arrangement according to claim 1, wherein the coupling device provides a magnetically permeable element which is movable between changeably selectable first gear members, a particular first gear member being selected by moving the magnetically permeable element to that said first gear member such that the magnetically permeable element forms a magnetic flux path which encourages the respective magnetic field to enter the interpoles via the magnetically permeable element.

16. A magnetic gear arrangement according to claim 2, wherein
the coupling device provides a magnetically permeable element which is movable between changeably selectable first and second gear members, a particular first or second gear member being selected by moving the magnetically permeable element to that said first or second gear member such that the magnetically permeable element forms a magnetic flux path which encourages the respective magnetic field to enter the interpoles via the magnetically permeable element, and
the coupling device provides a first magnetically permeable element for the first gear members and a second magnetically permeable element for the second gear members.

* * * * *